Oct. 12, 1948.　　　　　　F. J. LINGEL　　　　　　2,450,973
INSTRUMENT CURRENT TRANSFORMER WITH PART TURN WINDING
Filed April 28, 1945
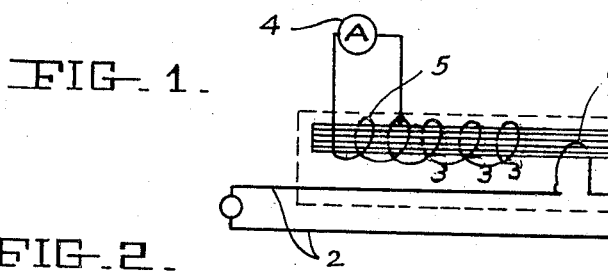
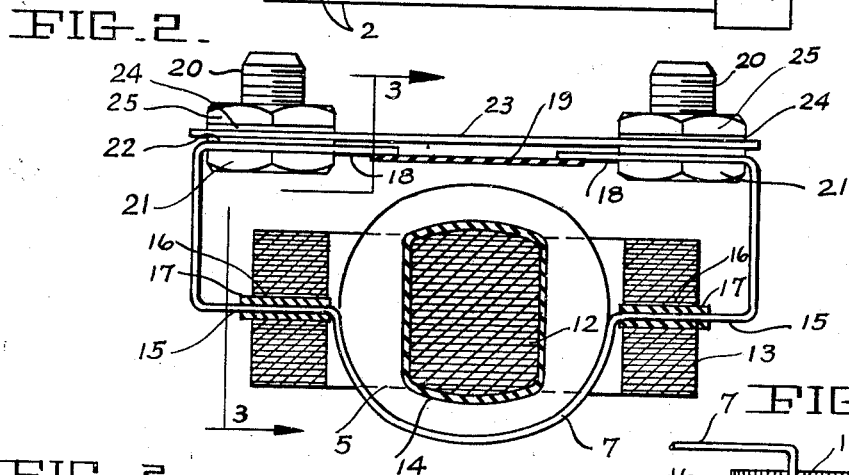
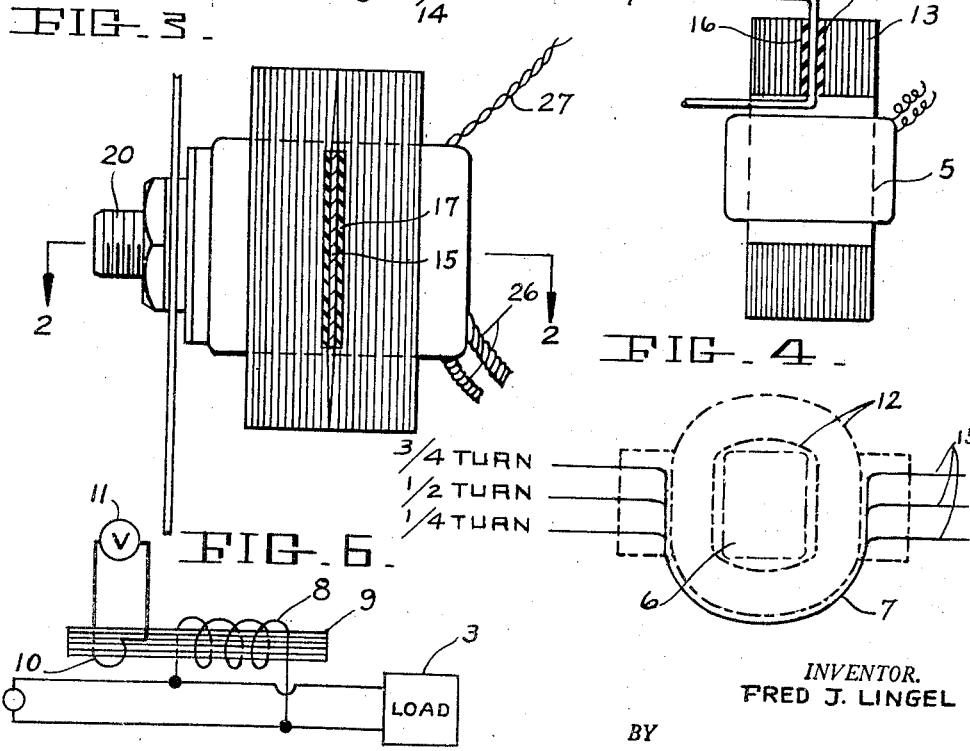
INVENTOR.
FRED J. LINGEL
BY
Toulmin & Toulmin
ATTORNEYS Patented Oct. 12, 1948

2,450,973

UNITED STATES PATENT OFFICE 2,450,973

INSTRUMENT CURRENT TRANSFORMER WITH PART TURN WINDING

Frederick J. Lingel, Bluffton, Ohio, assignor to The Triplett Electrical Instrument Company, Bluffton, Ohio, a corporation of Ohio Application April 28, 1945, Serial No. 590,839

2 Claims. (Cl. 175—358)

The present invention relates to instrument transformers, particularly to those employed for stepping-up the voltage and thereby reducing the current through the instrument and also to those employed for stepping-down the voltage in order to reduce the voltage applied to a measuring voltmeter.

When it is desired to measure the current flowing through a main circuit in which the voltage is quite large, it is customary to pass the current through the primary of a transformer adapted to accommodate the large currents and to transform the voltage in the secondary in a proportional manner to reduce the current flowing in the secondary to that value which can readily be measured by the ammeter at hand. On certain occasions it has been found that the current rating of the ammeter is not a submultiple of the current flowing through the main circuit as measured in whole turn proportions and inasmuch as the transformers of the prior art are always designed on a whole turn basis the turn ratio may be such as to cause overloading of the ammeter. In order to rectify this situation the art has usually doubled the number of turns on the primary and secondary windings of the current transformers so as to provide the proper turn ratio as would limit the current in the ammeter to safe amounts. For example, supposing that the ratio between the current rating of the ammeter and the current in the main circuit is 50, it is necessary to transform and increase the voltage supplied to the secondary winding of the transformer to which the ammeter is connected 50 times. But now let us further suppose that the current transformer actually had a transformation ratio of only 25 which, if the ammeter were connected across secondary would obviously result in an excessive current. In order to correct this situation, it has been the practice of the prior art to increase the number of turns in the secondary in order to give the required voltage transformation and in like degree reduce the secondary current. This has resulted in the making of relatively large transformers with their attendant bulk, and increases in core and conductor loss, all of which results in a reduction of efficiency.

The primary object of the invention is to provide instrument transformer, for current or voltage measurement and in which the proper voltage or ampere ratio transformation is obtained, suited exactly to the needs of the measuring instrument and in which the transformer has no greater bulk than the ordinary transformers used but quite unsatisfactorily for this purpose.

Another object is to provide an instrument transformer which will extend the range of current or voltage for which a given instrument can be used so that the instrument has greater utility in measuring large currents or large voltages.

In the case of a current transformer the secondary winding usually consists of a considerable number of turns whereas the primary winding contains only a few turns so that the greatest part of the expense of a transformer can be attributed to the secondary winding. Accordingly, another object of the invention is to provide a current transformer which will extend the current range over which a given ammeter can be employed but without requiring any increase either in the size of the winding or the number of turns of the secondary coil to which the ammeter is connected, thus avoiding any increase in manufacturing costs.

In carrying out these objects, I provide an improved transformer in which the proper ratio of transformation is obtained, not by changing the secondary winding to give a larger voltage ratio but by reducing the number of turns in the primary winding even to the extent of providing a fractional turn in that winding. It is apparent that under these conditions the primary winding does not have to be a submultiple in whole turns of the secondary winding but instead could have an integer number of turns and any fraction of a turn so that precisely the proper transformation in voltage or current could be obtained which would satisfy the requirement of the measuring instrument. It is, therefore, no longer necessary to double the number of turns on the primary and secondary, or otherwise to increase the number of turns in either the primary or secondary to obtain the desired translation ratio because in accordance with my invention the proper ratio can be obtained by employing fractional turns in one or both of the windings of the transformer.

The invention will be better understood when reference is made to the following description and the accompanying drawings, in which:

Figure 1 is a schematic view of a current measuring system improved in accordance with my invention and as applied to a heavy current carrying system connected between an alternator and a load.

Figure 2 is a cross-sectional view of the improved transformer, the coils and supporting apparatus being shown in elevation for clearness.

Figure 3 is a section taken along line 3—3 of Figure 2.

Figure 4 diagrammatically shows the manner in which the improved transformer can be modified to give any degree of transformation desired, necessitating fractional turns of wire in the primary or secondary windings.

Figure 5 illustrates a modification of the transformer shown in Figures 1, 2 and 3 while Figure 6 depicts the manner in which the improved transformer can be used for high voltage measurement.

As shown in Figure 1, a source of alternating current energy feeds a load 3 through a pair of mains 2. A measuring instrument exemplified as an ammeter is designated 4. Let us assume that the current rating of this ammeter as compared with the current flowing through the mains 2 is such as to require a voltage step-up of 4 to 1. Under normal circumstances there would be four turns of wire 5 wound about the core 6 and the primary winding 7 which is connected in series with the mains 2 would have a whole turn. However, in accordance with my invention the primary winding 7 is constituted only of half a turn so that the secondary winding 5 need employ only two turns in order to retain the 4 to 1 voltage or current transformation. Consequently, the size of the secondary winding 5 remains relatively small and the range of the ammeter 4 in terms of the current flowing through the main circuit 2 is proportionately increased. Perhaps the greatest advantage of the improved transformer in which fractional turns are employed either in the primary or secondary winding is that the exact ratios of transformation can be obtained in order to satisfy the most rigid requirements of a measuring instrument which responds only to narrow limits of current or voltage being measured. It is apparent that the fractional turn can be applied to the secondary winding 5 so that instead of having a plurality of whole turns, as illustrated, this winding may comprise one and one-half, two and one-half or even one-half turn if necessary.

In Figure 6, I have shown the application of my invention to a voltage transformer in which the primary 8 is connected across the alternator and is in inductive relation through a core 9 with a fractional turn secondary 10 connected to a voltmeter 11. In this particular case, it is desirable to effect a voltage step-down, and as illustrated, there are three loops on the primary and a one-half loop on the secondary, making a transformation ratio of six. As will be explained in connection with the Figures 2 and 3, the fractional turn winding is formed by bending a metal strap (in the case of a current transformer) around the secondary winding and bringing the ends of the strap out from opposite sides of the secondary winding at half-way positions so that the winding will extend over only a fractional part of the core.

Figure 4 which diagrammatically illustrates the structure described immediately above, indicates the possibility of obtaining a one-quarter, one-half or three-quarter turn depending on the relative amount that the metal strap extends about the central core and is therefore subjected to the magneto-motive force in that core. Obviously, a partial turn of any fractional amount can be obtained in this manner and this fractional turn can either constitute a winding by itself or can be added to any number of turns of a winding and can be applied equally as well to the primary or secondary winding.

A practical structure by which the fractional turn winding can be applied to a transformer structure is shown in Figures 2 and 3. In these figures, reference character 12 designates the central leg or shunt of a rectangularly shaped core, the outer legs of which are indicated at 13. The core is made up of iron laminations suitably insulated to reduce eddy current loss and secured together in any suitable and well-known manner. The secondary winding 5 (Fig. 1) is wound around the central leg or shunt 12 with the proper insulation indicated at 14 provided. The half turn 7 which comprises a strip or band of copper is bent around the outer periphery of the coil 5 but insulated therefrom and the ends 15 of the strip pass through openings 16 in the core 13 and insulation material indicated at 17 is interposed between the core and each strip. The strips are given angular bends to assume a position directly above the transformer but separated from one another as indicated at 18. A strip or plate of insulation material 19 may be secured to the ends 18 in order to strengthen the latter and keep them in alignment. A threaded stud 20 to which a nut 21 is secured serves as a terminal for connection to the mains 2. It will be noted that the nuts 21 contact the underside of the strip legs 18. There is a washer 22 of insulation material resting on top of the strip portions 18 and surrounding each stud 20. These washers carry a mounting plate 23 which is suitably insulated from the studs 20 and directly on top of the plate there is another pair of insulating washers 24 and finally a nut 25. Thus, the mounting plate 23 is rigidly secured to the studs 20 by the clamping effect of the nuts 21 and 25 and at the same time is insulated from the studs so as not to short circuit the terminals.

The leading-in conductors for the secondary winding 5 are indicated at 26 and if desired an intermediate conductor 27 may be provided.

As stated hereinbefore when the stud terminals 20 are connected in series with the mains 2, electrical energy flows through the half turn 7 which induces currents in the secondary 5 in accordance with the ratio of transformation. The ammeter 4 which may be connected to the conductors 26 will give a reading which when the transformation ratio is taken into account represents the amount of current flowing from the alternator 1 to the load 3. It has been found that the metal strap or band 7 which comprises the half turn primary can be readily applied to the outside surface of the secondary coil 5 and adequately insulated therefrom so that the entire structure lends itself well to conditions of carrying considerable currents. The fact that the strip portions 15 pass through the laminations 13 is beneficial from the support standpoint and it is a simple matter to adequately insulate the strip from the laminations. Inasmuch as the strip 7 and its end portions 15, 18 and the connecting strip 19 form a rectangular member completely enclosed, the structure as a whole is very rigid and lends itself readily to mounting on switchboards.

In Fig. 5 there is shown still another modification of the improved transformer. In this structure the secondary coil 5 is wound around one leg of a core type, or two-legged core 13, but instead of applying the primary fractional turn 7 to the curved outside surface of the secondary 5 this turn is caused to enter and leave one of the legs of the core from which it is suitably insulated. As in the case of the other figures, the fractional turn 7 is connected in series with the mains 2 and the magnetomotive force setup throughout the core by the current passing through this partial turn will induce currents in the secondary coil 5 to which the measuring ammeter is connected. It is apparent that the ratio transformation between the partial turn 7 and the coil 5 in Fig. 5 could be determined experimentally and it is further evident that any other fractional turn ratio could readily be obtained by changing the position of the strip 7 within its core leg.

This design has particular advantages in multi-range instrument current transformers where the size of the transformer is determined by the lower range windings. For example, in the particular application in which this design will be used the transformer has a secondary winding connected to a 1 ampere instrument. The multi-turn primary winding has taps at 1, 2.5, 5, 10 and 25 amperes. The 25 ampere winding is made up of two turns so that the maximum current which can be obtained from this particular transformer by conventional design would be 50 amperes or 1 turn on the primary. In order to go to 100 amperes, it would then be necessary to double both primary and secondary turns and increase the amount of iron to prevent saturation. By going to the half turn winding described, this increase is unnecessary.

It will be understood that I desire to comprehend within my invention such modifications as come within the scope of the claims and the invention.

Having thus fully described my invention, what I claim as new and desire to secure by Letters Patent is:

1. An instrument transformer comprising a rectangular core having a central leg, a pair of concentrically arranged windings on said leg, one of said windings extending completely around the leg and the other of said windings extending only partially around the leg, the last mentioned winding being taken out through oppositely disposed portions of the core and means for insulatingly securing said last-mentioned winding to said core in order to constitute a rigid structure.

2. An instrument transformer comprising a laminated core of rectangular configuration and having a central leg on which is mounted a pair of windings, one of said windings completely surrounding the core leg, and the other of said windings only partially surrounding the core leg, the last mentioned winding passing through oppositely disposed portions of the core.

FREDERICK J. LINGEL.

REFERENCES CITED

The following references are of record in the file of this patent:

UNITED STATES PATENTS

| Number | Name | Date |
|---|---|---|
| 1,700,689 | Sparks | Jan. 29, 1929 |
| 1,849,485 | Gibbs et al. | Mar. 15, 1932 |
| 1,952,072 | Jewell | Mar. 27, 1934 |
| 2,246,167 | D'Entremont | June 17, 1941 |
| 2,273,534 | Mitchell | Feb. 17, 1942 |